Sept. 24, 1968 W. W. MARTINMAAS 3,402,941
ADJUSTABLE ROLL BAR FOR TRACTORS
Filed May 5, 1967 2 Sheets-Sheet 1

Inventor:
Werner W. Martinmaas
By: Hofgren, Wegner, Allen,
Stellman & McCord
Attorneys

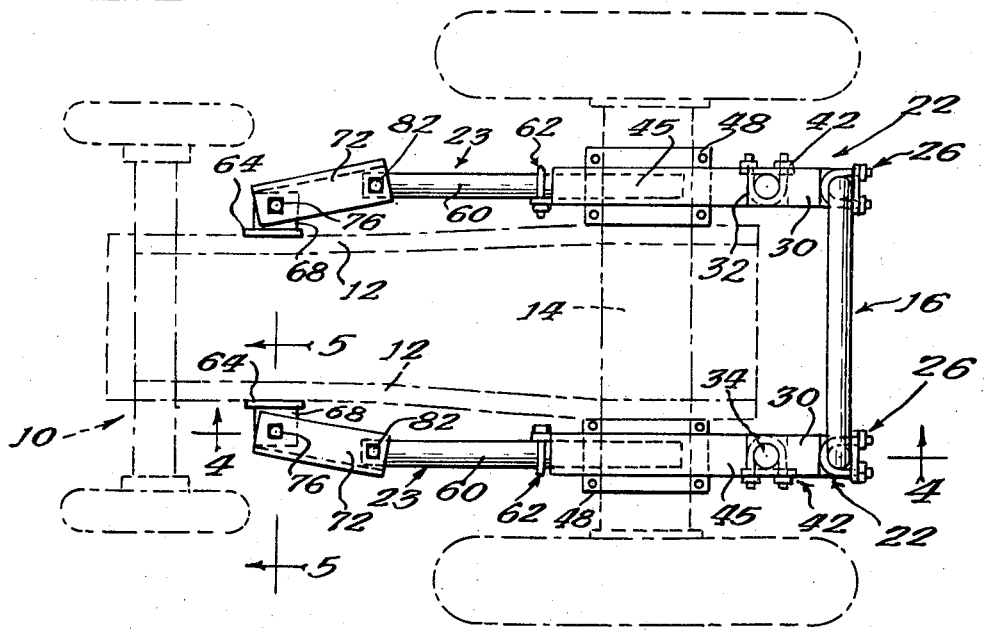
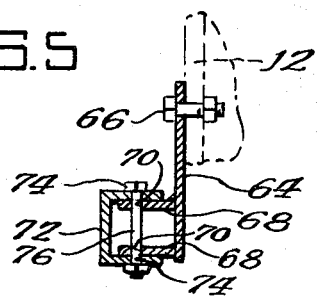
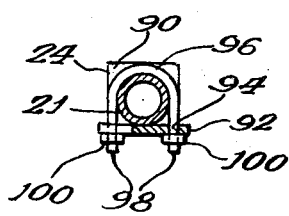
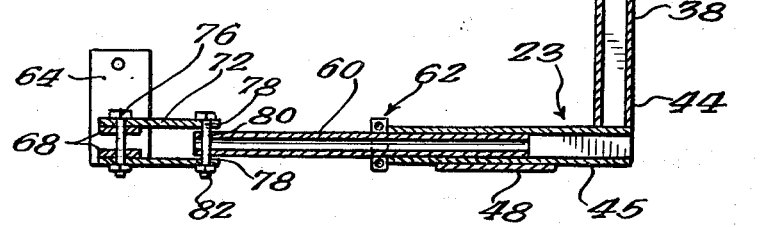

United States Patent Office 3,402,941
Patented Sept. 24, 1968

3,402,941
ADJUSTABLE ROLL BAR FOR TRACTORS
Werner W. Martinmaas, 835 10th Ave.,
Watertown, S. Dak. 57201
Filed May 5, 1967, Ser. No. 636,413
7 Claims. (Cl. 280—150)

ABSTRACT OF THE DISCLOSURE

A tractor roll bar assembly which includes a multiple member frame having a plurality of rotatable and slidable locking connections between frame members to permit adjustment of the length and span of the assembly for installation on a wide variety of different makes and models of tractors.

Background of the invention

Every year many people are killed or injured in tractor accidents in most of which the tractor rolls over and crushes the operator. As a result, various devices have been proposed for protecting the operators of tractors. Some such devices are roll bars which support the rear of the tractor if it rolls so that it cannot crush the operator; while others are intended to prevent the tractor from rolling to an inverted position.

Because there are many makes and models of tractors, and a wide variety of attachments, such as power take-off units, that occupy space on the tractor frame, roll bars have heretofore been made to fit only one particular make and model of tractor. Thus, a dealer must keep many different roll bar assemblies in stock, or else his customers must suffer the delays caused by ordering roll bar assemblies from a remote warehouse stock. Either alternative is undesirable.

Summary of the invention

The principal object of the invention is to provide a new and adjustable tractor roll bar that is constructed for mounting on virtually any make or model of tractor.

More specifically, it is an object of the invention to provide a roll bar assembly formed of a multiple member frame including a plurality of rotatable and/or slidable joints between the various frame members together with means for rigidifying the joints whereby the joints permit rotatable and/or slidable adjustment of the various members relative to each other so that the roll bar assembly may be fitted to any particular make or model of tractor.

Another object is an adjustable roll bar assembly including a U-shaped guard member, guard base means including a pair of adjusting members releasably engaging the legs of the guard member to mount the latter in a vertical position, the guard base means affording a base of variable span and height, means for releasably locking the guard base means at a selected span and with the bight of the guard member at a desired height, mounting means for the guard base means for securing the latter to a vehicle including a pair of upright legs releasably engaging the guard base means, and horizontal legs, and attaching means for securing the mounting means to a vehicle.

A still further object is a roll bar assembly such as that set forth in the preceding paragraph wherein each of the guard base adjusting members include an offset member having horizontally spaced connections to the guard member and to the mounting means.

Another object is the provision of a roll bar assembly such as that stated above wherein each horizontal leg of the mounting means comprises a shaft telescopingly received within a tubular member and releasable means for clamping said shaft to the tubular member.

Other objects and advantages of the invention will become apparent from the following specification taken in connection with the accompanying drawings.

Description of the drawings

FIG. 3 is a plan view of the roll bar assembly additionally indicating the form of the tractor in dotted lines;

FIG. 4 is a vertical section taken approximately along the line 4—4 of FIG. 3;

FIG. 5 is a fragmentary vertical section taken approximately along the line 5—5 of FIG. 3; and FIG. 6 is a view of a clamping means with portions broken away for clarity.

Detailed description

Figure 1:
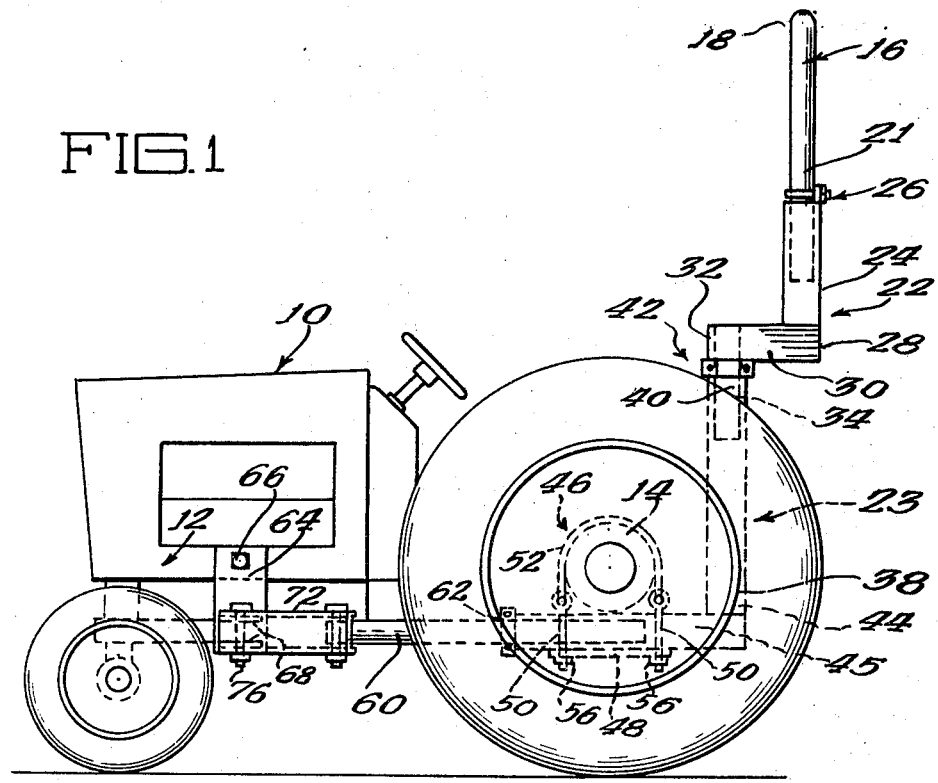
FIG. 1 is a side elevation of the tractor including a roll bar assembly embodying the invention.

An exemplary embodiment of a roll bar assembly made according to the invention shown mounted on a tractor generally designated 10 is best seen in FIG. 1. The tractor 10 includes a forwardly extending frame member 12 and a rear axle 14 to which the roll bar assembly is secured.

Figure 2:
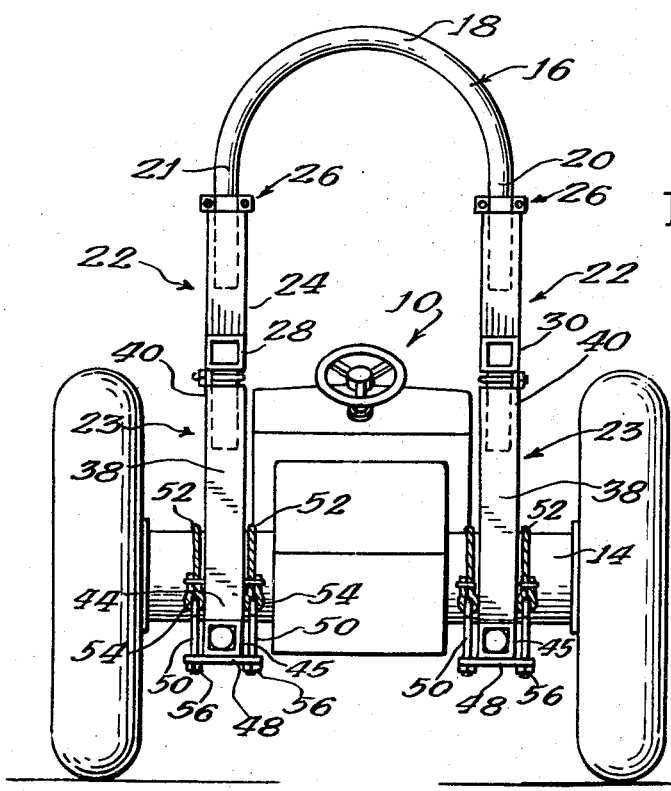
FIG. 2 is a rear elevation of the tractor and roll bar assembly.

As best seen in FIG. 2, the roll bar assembly includes a guard 16 in the form of an arch or inverted U having its bight 18 located somewhat higher than the position of the head of an operator of the tractor 10. Additionally, the guard member 16 includes downwardly extending legs 20 and 21 that are adapted to flank the tractor seat upon which the operator sits.

The guard 16 is connected to the tractors by a guard base means indicated generally at 22, and mounting means, indicated generally at 23. Since both the guard base and the mounting means have identical structure for the leg 20 and for the leg 21 of a guard 16, only the structure used in conjunction with the leg 21 will be described.

Referring to FIGS. 1 and 4, the guard base means 22 is comprised of a tubular member 24 of rectangular cross section in which the leg 21 is telescopingly received. The guard base means 22 further includes a first securing means generally designated 26 at the upper end of the member 24 which serves to clamp the leg 21 to the member 24 in any position of slidable and/or rotatable adjustment of the former with respect to the latter. The nature of the securing means 26 will be described hereinafter.

The guard base means 22 further includes a horizontally offset member 30 having a first end 28 connected to the lower end of the member 24 and a second end 32 terminating in a downwardly projecting stub 34 which may be rigidly secured to the offset member 30 by any suitable means such as a weld or a pin.

The downwardly projecting stub 34 in turn is secured to the mounting means 23 which is comprised of an L-shaped member 36 that has tubular legs 38, the upper end 40 of which telescopingly receives the stub 34. There is provided a clamping means 42 at the upper end 40 of the leg 38 which serves to clamp the stub 34 in the tubular leg 38 in any position of slidable and/or rotatable adjustment of the former with respect to the latter. The L-shaped member also includes a horizontally disposed tubular leg 45 of rectangular cross section which extends forwardly beneath the rear axle 14 and alongside the frame 12.

Securing means, generally designated 46, secures the leg 45 of the mounting means 35 to the underside of the axle 14; and as best illustrated in FIGS. 1 and 2, the securing means 46 includes a plate 48 which is adapted to abut the undersurface of the horizontal leg 45 and includes four apertures at its corners (not shown) for receiving eye bolts 50. A pair of steel cables 52 have loops 54 at their ends extending through the eye bolts 50, and tightening nuts 56 are disposed on the threaded ends of the eye bolts 50. The arrangement is such that the steel cables may be swung over the rear axle 14 with the eye bolts 50 depending therefrom and impaling the respective apertures in the plate 48 so that upon tightening of the nuts 56, horizontal leg 45 of the mounting means 23 is drawn tightly against the underside of the axle 14. Preferably, the plate 48 is not secured to the leg 45 so that the position of the latter with respect to the axle 14 in the direction running with the length of the tractor 10 may be varied.

The mounting means 23 further includes an elongated shaft 60 which is telescopingly received in the forward end of the horizontal leg 45 and, as best seen in FIGS. 1, 3 and 4, securing means generally designated 62 is provided on the leg 45 for clamping the shaft 60 to the leg 45 in any position of slidable and/or rotatable adjustment of the former with respect to the latter. The construction of the securing means 62 will be described hereinafter.

As seen in FIGS. 1, 3 and 5, the mounting means 36 further includes a plate 64 which may be secured by means of bolts 66 or the like in substantially parallel relationship to a face of the frame 12 of the tractor 10. As best seen in FIG. 5, the lower end of the plate 64 is provided with a pair of horizontally outwardly projecting tabs having aligned apertures 70 near their outer extremities. A C-shaped channel member 72 includes corresponding apertures 74 at its forward end to receive a pivot pin 76, thereby providing a pivotal connection between the C-shaped channel 72 and the plate 64.

The C-shaped channel 72 serves as a link between the plate 64 and the forward end of the shaft 60, and for this purpose the rearmost end of the channel 72 includes aligned apertures 78 (FIG. 4) while the forward end of the shaft 60 includes similarly aligned apertures 80. A pivot pin 82 is impaled through the apertures 78 and 80 to pivotally link the shaft 60 and the channel member 72.

The securing means 26, 42 and 62 will now be described in conjunction with FIG. 6, and since each of the securing means is identical, it is to be understood that the construction descceribed is used for each such securing means.

Assuming that the securing means 26 is being described, an end 90 of the member 24 mounts a small plate 92 which may be secured to the member 24 as by welding. The plate 92 is, in effect, an extension of a side of the member 24 and includes a pair of apertures 94 (only one of which is shown in FIG. 6) that are spaced apart a distance approximately equal to the diameter of the leg 21 of the guard 16.

A U-bolt 96 has its threaded ends 98 extending through the apertures 94 to receive nuts 100 on the side of the plate 92 opposite the leg 21 so that the U-bolt 96 and the plate 92 surround the leg 21. When the nuts 100 are tightened, the U-bolt 96 is drawn tightly about the leg 21 to clamp the latter to the member 24. Of course, when the nuts 100 are backed off from the plate 92, the position of the leg 21 within the member 24 may be varied angularly as well as longitudinally.

The above described construction of the guard base 22 and the mounting means 23 permit a variety of adjustments so that a single assembly may be fitted to virtually any make or model of tractor. For example, by virtue of the pits provided by the pins 76 and 82, the device accommodates wide variations in the distance between the tractor frame members 12. Similarly, because of the extensible connection between the shaft 60 and the leg 45 forming part of the mounting means 23, the over-all length of the roll bar assembly may be varied to accommodate it to tractors of varying lengths. Also, because of the slidable connection between the upright leg 38 of the mounting means 23 and the stub 34 of the guard base means 22 and the slidable connection between the member 24 and the legs 20 and 21 of the guard 16, the height of the bight 18 of the guard 16 may be varied over a substantial range to insure protection of the operator for tractors of virtually any height.

The pivotal connection between the stub 34 and the vertical leg 38 of the mounting means 23 as well as those between the legs 20 and 21 of the guard 16 and the members 24 of the guard base means 23, and the presence of the offset members 30, permits the center of the guard 16 to be disposed off the center line of the tractor, as may be required where the tractor seat is not centered upon the tractor. Similarly, where peripheral equipment is secured on one side of the rear axle 14, the distance between the center line of the tractor and one side of the mounting means 23 may be different than the distance between the center line of the tractor and the other side of the mounting means 23 to accommodate such equipment, and yet the guard 16 may be centered upon the tractor 10. Thus, it will be appreciated that the invention provides an extremely adaptable, rigid roll bar assembly that may be mounted on virtually any make or model of tractor.

While I have described specific embodiments of my invention for exemplification purposes, I do not wish to be limited to the details set forth but rather to have the invention construed as set forth in the following claims.

I claim:
1. An adjustable roll bar for tractors comprising, in combination: a generally rigid U-shaped guard member adapted to be mounted in an inverted position at the rear of a tractor with the legs flanking the seat and its bight portion above the head of the tractor operator; guard base means including a pair of adjusting members releasably engaged with the legs of the guard member, said guard base means affording a base of variable span and height; means for releasably locking said guard base means at a selected span and with the bight of the guard member at a desired height; mounting means for securing the guard base means to a tractor, said mounting means including a pair of upright legs releasably engaging the guard base means, and horizontal legs; first attaching means for securing the mounting means to a rear part of a tractor with the horizontal legs extending forwardly beneath the axle; and second attaching means for securing the forward portion of the frictional legs of the mounting means to the tractor side frames.

2. The roll bar assembly of claim 1 wherein each of said guard base means includes an offset member having horizontally spaced connections to said guard member and to said mounting means.

3. The roll bar assembly of claim 1 wherein each said guard base means includes a generally vertical member telescopingly connected to the corresponding leg of said guard member, an offset member secured to the vertical member and a vertically arranged element horizontally spaced from said vertical member and telescopingly connected to a corresponding one of said upright legs.

4. The roll bar assembly of claim 1 wherein each said horizontal leg comprises a shaft telescopingly received within a tubular member and releasable means for clamping said shaft to said tubular member.

5. The roll bar assembly of claim 1 wherein said second attaching means comprise a link pivotally connected to the forward end of each of said horizontal legs and adapted to be pivotally connected to the tractor side frame.

6. The roll bar assembly of claim 1 wherein said first attaching means comprises a pair of cables, each of said cables being adapted for lashing a rear portion of one of the mounting means horizontal legs to the rear axle of a tractor.

7. The roll bar assembly of claim 1 wherein each of said pair of adjusting members comprises a vertical tubular member telescopingly receiving a corresponding leg of said guard member, an offset member secured to said vertical member, and a stub shaft depending from said offset member at a location horizontally spaced from said vertical member; said releasable locking means comprising a first clamp on each of said vertical members for clamping the corresponding guard member leg thereto; said upright legs being tubular and telescopingly receiving a corresponding one of said stub shafts; means for clamping each of said stub shafts to its corresponding upright leg; and said horizontal legs each comprises a shaft telescopingly received within a horizontal tubular member and a second clamp for clamping said shaft to said horizontal tubular member; the first attaching means includes cables for lashing the rear portion of the mounting means to the axle of a tractor, and the second attaching means includes a link pivotally connected to the forward end of each of said horizontal legs and adapted to be pivotally connected to the tractor side frame.

References Cited

UNITED STATES PATENTS

| | | | |
|---|---|---|---|
| 2,785,002 | 3/1957 | Schumaker | 296—102 |
| 2,943,884 | 7/1960 | Fritzmeier | 296—102 |
| 3,244,251 | 4/1966 | Duncan | 280—150 |

BENJAMIN HERSH, *Primary Examiner.*

R. SONG, *Assistant Examiner.*